United States Patent [19]
Reno

[11] 3,788,438
[45] Jan. 29, 1974

[54] CLUTCH ACTUATING MECHANISM WITH AUTOMATICALLY DETERMINED FREE PLAY

[76] Inventor: Frederick Reno, 26629 Dow St., Detroit, Mich. 48239

[22] Filed: Dec. 6, 1972

[21] Appl. No.: 312,443

[52] U.S. Cl................ 192/110 R, 192/99 S, 74/512
[51] Int. Cl.......................... F16d 21/04, G05g 1/14
[58] Field of Search 192/89 R, 98, 99 A, 99 S, 111 B, 192/111 R; 74/512

[56] References Cited
UNITED STATES PATENTS

| | | | |
|---|---|---|---|
| 3,587,802 | 6/1971 | Pink | 192/89 R |
| 3,730,318 | 5/1973 | Camp | 192/99 S |
| 3,365,042 | 1/1968 | Smirl et al. | 192/99 S X |
| 3,250,356 | 5/1966 | Zeidler | 192/89 R X |

*Primary Examiner*—Benjamin W. Wyche
*Assistant Examiner*—Lance W. Chandler
*Attorney, Agent, or Firm*—Keith L. Zerschling; Clifford L. Sadler

[57] ABSTRACT

The present invention relates to a clutch actuating mechanism having a Bowden wire assembly interconnecting a clutch pedal and a clutch release lever. The mechanism is constructed to automatically establish an appropriate amount of free play in the system upon actuation of the clutch pedal for the first time. The Bowden wire assembly includes a tubular sheath that has one end secured to body structure adjacent to the pedal and its other end secured to chassis structure adjacent to the clutch release lever. A flexible cable is slidably supported in the sheath and has one end connected to the clutch pedal. The other end of the cable has spaced apart balls which form stop members secured to it. The outer ball is rigidly affixed to the cable and the inner ball is slidable on the cable when subjected to a force that exceeds a predetermined minimum value. The inner ball engages the clutch release lever. Upon installation, the sheath is attached to the body and the chassis in a manner to eliminate any slack or free play in the system. When the clutch pedal is depressed, the force will be transmitted to the inner ball causing it to slide into engagement with the outer ball. Free play will be automatically established in the mechanism by the displacement of the inner ball.

8 Claims, 2 Drawing Figures

CLUTCH ACTUATING MECHANISM WITH AUTOMATICALLY DETERMINED FREE PLAY

BACKGROUND OF THE DISCLOSURE

The present invention relates to a Bowden wire type clutch actuating mechanism for a motor vehicle, and more particularly to a clutch actuating mechanism that is constructed to automatically establish an appropriate amount of initial free play without using external gauges.

In conventional clutch actuating systems employing Bowden wire actuators, it is common practice to establish free play by pulling the Bowden wire assembly until the clutch release bearing is in firm contact with the clutch release fingers of the pressure plate assembly. The jam nuts securing one end of the Bowden wire sheath are then backed off a desired amount and locked in position. The amount that the jam nuts are backed off determines the initial free play. In order to provide the proper level of free play, a gauge must be used to meaure the distance which the nuts are backed off.

It is the principal object of the present invention to provide a clutch actuation system of the Bowden wire type which automatically establishes the amount of initial free play without the use of external gauges.

BRIEF SUMMARY OF THE DISCLOSURE

In the presently preferred embodiment of this invention, a clutch pedal is connected to the clutch release lever of a motor vehicle clutch by means of a Bowden wire assembly. The Bowden wire includes a flexible tubular housing or sheath that has one end connected to body structure adjacent to the clutch pedal by means of a pair of jam nuts and its other end secured to a chassis member adjacent to the clutch release lever by means of a second pair of jam nuts.

A flexible cable is slidably supported in the sheath and has one end connected to the clutch pedal by means of a clevis. The other end of the cable extends through an aperture in the clutch release lever. A first or outer ball is rigidly secured to the end of the cable extending through the clutch release lever. A second or inner ball is connected to the cable at a point spaced inwardly of the first ball.

While the outer ball is rigidly affixed to the end of the cable, the inner ball is supported on the cable for sliding movement when subjected to a force that exceeds a predetermined minimum value.

A coil spring is interposed between the sheath and the clutch release lever. The spring urges the release lever into engagement with the inner ball.

Upon installation of the clutch actuating system, the first pair of jam nuts are tightened and the second jam nuts are adjusted to eliminate all free play in the system. This is done by tightening the second jam nuts so that the clutch release bearing is brought into firm contact with the clutch release fingers of the pressure plate assembly. Adjustment of the nuts which hold the end of the sheath causes the cable end that engages the clutch release lever to move a corresponding amount.

With all free play removed from the system, the clutch pedal is depressed and the force exerted on the Bowden wire cable will cause the second ball to slide until it is seated against the rigidly affixed first ball. The sliding displacement of the second ball will automatically establish a predetermined amount of free play in the system. A predetermined amount of clearance will automatically be provided between the clutch release bearing and the clutch release fingers of the pressure plate assembly when the clutch pedal is released and the clutch is engaged. Thus, the free play is provided without the use of external gauges.

BRIEF DESCRIPTION OF THE DRAWINGS

The many objects and advantages of a clutch actuating system constructed in accordance with this invention will become apparent upon consideration of the following detailed description and the accompanying drawings, in which.

DETAILED DESCRIPTION OF THE PREFERRED EMBODIMENT

Figure 1:
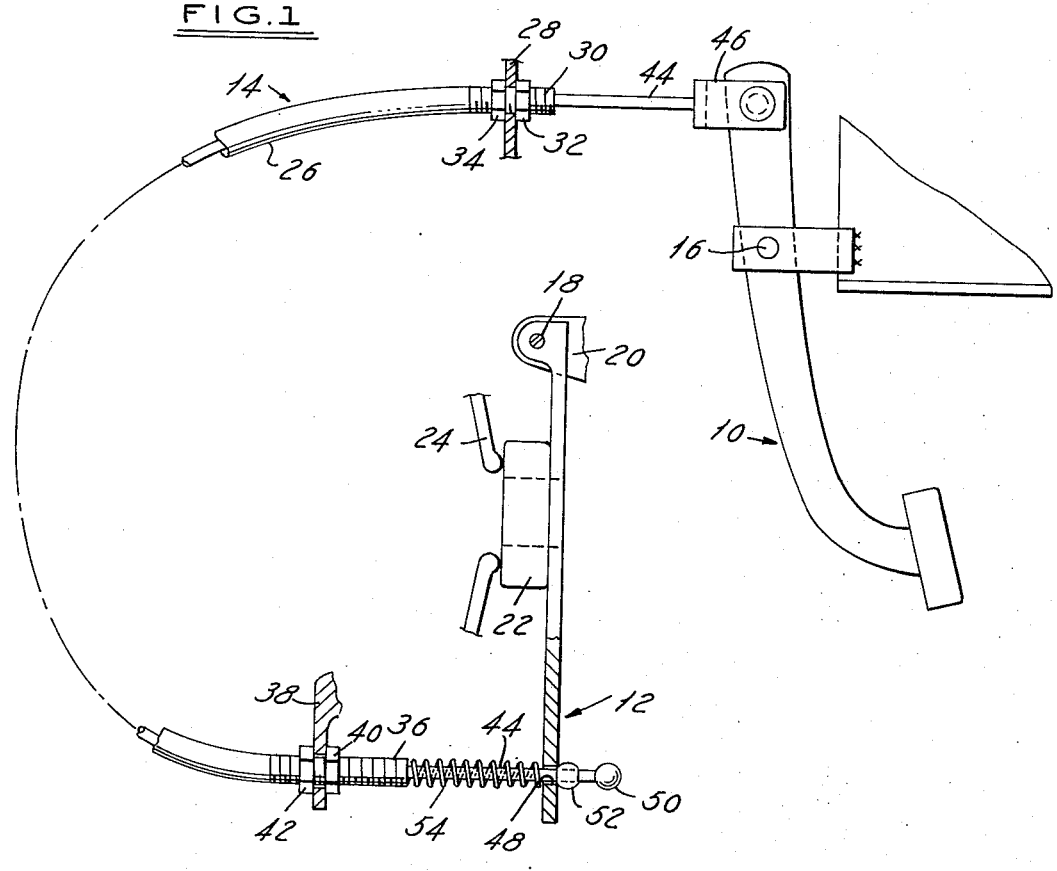
FIG. 1 is a schematic representation of a motor vehicle clutch actuating mechanism embodying this invention.

Referring now to the drawings, wherein the presently preferred embodiment of this invention is illustrated, FIG. 1 discloses a clutch actuating mechanism. The mechanism of FIG. 1 includes a clutch pedal 10 that is connected to a clutch release lever 12 by means of a Bowden wire assembly 14.

The clutch pedal 10 is a lever of the first class having a mid portion pivotally supported at 16 upon a bracket supported from the vehicle body.

The clutch release lever 12 forms a part of a motor vehicle clutch. The release lever 12 is a lever of the second class having its upper end pivotally supported at 18 upon a fulcrum 20 which forms a part of the clutch housing. The lever 12 engages a clutch release bearing 22 which bears against clutch release fingers 24 of a clutch pressure plate assembly. The clutch assembly is spring pressed to a normally engaged condition. When the release lever 12 is pivoted in a clockwise direction, the bearing 22 engages the release fingers 24 and causes them to move the pressure plate of the clutch assembly out of engagement with the clutch disc, such action taking place in a reasonably conventional fashion.

The Bowden wire assembly 14, which interconnects the clutch pedal 10 and the release lever 12, includes a flexible tubular housing or sheath 26 that has its upper end secured to a bracket 28 on the vehicle body. The upper end of the sheath 26 is provided with a threaded fitting 30 and first and second jam nuts 32 and 34 that are situated on either side of the body bracket 28.

The lower end of the sheath 26 is provided with a threaded fitting 36 that extends through an opening in a flange 38 connected to the fly wheel housing of the vehicle chassis. A second pair of jam nuts includes first and second nuts 40 and 42 that are positioned on either side of the flange 38.

The Bowden wire cable assembly 14 also includes a flexible cable 44 that is slidably supported in the sheath 26. The upper end of the cable 44 is pivotally secured to the upper end of the clutch lever 10 by means of a clevis 46.

The lower end of the clutch release lever 12 has an aperture 48 and the lower end of the Bowden cable 44 extends through the aperture 48. A first or outer ball 50 is rigidly affixed to the end of the cable 44. Spaced inwardly from the ball 50 is an inner or second ball 52 that will slide on the cable 44 when it is subjected to a force that exceeds a predetermined minimum value.

A coil spring 54 is interposed between the end of the sheath 36 and the release lever 12. The coil spring 54 urges the release lever 12 into contact with the second ball 52. The force of the spring 54 urging the lever 12 against the second ball 52 is less than the predetermined minimum force required to cause the sliding displacement of the second ball 52.

OPERATION

After the clutch pedal 10 and clutch assembly having release lever 12 are installed in the vehicle, the Bowden wire assembly 14 is installed to interconnect the pedal 10 and lever 12 as illustrated in FIG. 1. The upper end of the sheath 26 is secured to the bracket 28 by tightening the jam nuts 32 and 34. At the lower end of the Bowden wire 14, the outer jam nut 40 is backed off and the inner nut 42 is tightened causing the end of the sheath 26 and cable 44 to be displaced to the left. This displacement will exert a tension load on the cable 44 and cause the release lever 12 to be pivoted in a clockwise direction. The jam nut 42 is tightened finger tight until the release bearing 22 comes into firm contact with the release fingers 24. The second jam nut 40 is then tightened to lock the lower end of the sheath 26 to the flange 38.

Figure 2:
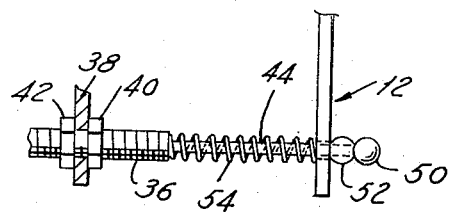
FIG. 2 is an elevational view, partly in section, showing the interconnection between the Bowden wire and the clutch release lever after the free play adjustment has been made.

Free play is automatically established in the system upon application of adequate pressure to the clutch pedal 10. When a force is applied to the pedal 10, it will pivot about fulcrum 16 in a clockwise direction imposing a tension load on the cable 44. When the cable tension places a force on the inner ball 52 that exceeds the predetermined minimum, the inner ball 52 will slide into contact with the outer ball 50. Thus, the application of a force upon the pedal 10 will cause the inner ball 52 to seat against the ball 50, whereupon the components will assume the relative position shown in FIG. 2.

When the load is removed from the clutch pedal 10, the release lever 12 will rotate in a counterclockwise direction under the force of the spring 44 by an amount equal to the distance previously provided between the first and second balls 50 and 52. This displacement will establish, in an automatic fashion, the desired amount of clearance or free play between the release bearing 22 and the clutch fingers 24.

The outer and inner balls 50 and 52 function as stop members. The inner ball 52 acts as a stop member during initial installation of the mechanism when the jam nut 42 is tightened to remove all free play. The outer ball 50 serves as a stop member during subsequent applications of the clutch pedal to transmit force from the cable 44 to the release lever 12.

Thus, initial clutch free play is provided automatically by actuation of the clutch pedal at the time the clutch actuating mechanism is installed in the vehicle and it is done without the use of external gauges.

The foregoing description presents the presently preferred embodiment of this invention. Modifications and alterations may occur to those skilled in the art which will come within the scope and spirit of the following claims.

I claim

1. An actuating mechanism having a first movable member, a second movable member and connecting means operatively interconnecting said first and second movable members;
    said actuating mechanism including adjustment means constructed to automatically adjust the relative position of said first and second movable members;
    said connecting means having a linearly displaceable portion;
    said portion having first and second spaced apart stop members;
    said first stop member being rigidly affixed to said portion;
    said second stop member being normally immovable with respect to said portion;
    said second stop member being displaceable relative to said portion when subjected to a force that exceeds a predetermined minimum value;
    said second stop member engaging said first movable member;
    said actuating mechanism being constructed to transmit a force from said second movable member through said connecting means to said second stop member, to cause said second stop member to move into engagement with said first stop member and thereby automatically adjust the relative position of said first and second movable members.

2. An actuating mechanism according to claim 1 and including:
    spring means constructed to exert a force on said first movable member urging it into engagement with said second stop member,
    said force exerted by said spring means being less than said predetermined minimum force required to displace said second stop member.

3. An actuating mechanism according to claim 1 and including:
    said first and second movable members comprising pivotally supported first and second levers.

4. An actuating mechanism according to claim 1 and including:
    said first and second movable members comprising pivotally supported first and second levers,
    said connecting means comprising a guide means and a flexible cable supported by said guide means,
    said cable having one end connected to said second lever,
    said adjustment means connecting the other end of said cable to said first lever.

5. An actuating mechanism according to claim 1 and including:
    said first and second movable members comprising pivotally supported first and second levers,
    said connecting means comprising a guide means and a flexible cable supported by said guide means,
    said cable having one end connected to said second lever,
    said adjustment means connecting the other end of said cable to said first lever,
    spring means constructed to exert a force on said first lever urging it into engagement with said second stop member, said force exerted by said spring means being less than said predetermined minimum force required to displace said second stop member.

6. An actuating mechanism having a clutch free play establishing means for a motor vehicle clutch, said actuating mechanism including a clutch pedal, a clutch release lever and a Bowden wire assembly interconnecting said pedal and said lever;

said clutch pedal being displaceable from a clutch engaged position to a clutch disengaged position, said Bowden wire assembly comprising a tubular flexible sheath having its ends rigidly supported on vehicle structure;

a flexible cable slidably supported in said sheath;

said cable having one end connected to said pedal;

a first stop member rigidly affixed to the other end of said cable;

a second stop member spaced apart from said first stop member and normally immovably connected to said cable;

said second stop member being slidably displaceable on said cable when subjected to a force that exceeds a predetermined minimum value;

said clutch actuating mechanism being constructed to transmit a force from said clutch pedal to said second stop member that exceeds said predetermined minimum to cause said second stop member to be displaced into engagement with said first stop member and thereby automatically establish clutch free play when said pedal is in its said clutch engaged position.

7. An actuating mechanism according to claim 6 and including:

biasing means constructed to exert a force urging said clutch release lever into engagement with said second stop member;

said force exerted by said biasing means being less than said predetermined minimum force required to slidably displace said second stop member.

8. A method for establishing free play in a clutch system having a clutch pedal, a clutch and a Bowden wire assembly interconnecting said pedal and said clutch;

said clutch including a clutch release bearing, clutch release fingers engageable with said bearing and a clutch release lever engageable with said clutch release bearing;

said Bowden wire assembly including a flexible sheath supported on vehicle structure, a flexible cable slidably supported in said sheath and having one end secured to said clutch pedal;

said method comprising the steps of rigidly affixing a first stop member to said cable;

slidably supporting a second stop member on said cable in engagement with said clutch release lever and spaced from said first stop member;

adjusting the position of said flexible sheath to remove all free play between said clutch release bearing and said clutch release fingers;

applying a predetermined force to said clutch pedal causing said flexible cable to be tensioned and said second stop member to be displaced into contact with said first stop member whereby a predetermined amount of free play proportional to the displacement of said second stop member is established between said clutch release fingers and said clutch release bearing when said force is removed from said pedal.

* * * * *